(12) United States Patent
Chang et al.

(10) Patent No.: US 8,447,951 B2
(45) Date of Patent: May 21, 2013

(54) METHOD AND APPARATUS FOR MANAGING TLB

(75) Inventors: Xiao Tao Chang, Beijing (CN); Rui Hou, Beijing (CN); Wei Liu, Beijing (CN); Kun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 12/725,513

(22) Filed: Mar. 17, 2010

(65) Prior Publication Data

US 2010/0241822 A1    Sep. 23, 2010

(30) Foreign Application Priority Data

Mar. 23, 2009    (CN) .......................... 2009 1 0127588

(51) Int. Cl.
*G06F 12/00* (2006.01)
*G06F 12/10* (2006.01)

(52) U.S. Cl.
USPC ............ 711/207; 711/E12.001; 711/E12.061; 718/103

(58) Field of Classification Search .................. 711/207, 711/E12.001, E12.061; 718/103
See application file for complete search history.

(56) References Cited

U.S. PATENT DOCUMENTS 7,120,715 B2 * 10/2006 Chauvel et al. ............... 710/244
2008/0235487 A1 * 9/2008 Illikkal et al. ................. 711/207

FOREIGN PATENT DOCUMENTS

WO    WO 2007/147761 A1    12/2007
WO    WO 2008/012159 A1    1/2008

OTHER PUBLICATIONS

Ilya Burylov et al, "Intel Performance Libraries: Multi-Core-Ready Software for Numeric-Intensive Computation," p. 299-308, Intel Tech. Journ., vol. 11, Issue 4, Nov. 15, 2007.
Matthew F. Curtis-Maury, "Improving the Efficiency of Parallel Applications on Multithreaded and multicore Systems," Dissertation submitted to Virginia Polytechnic Institute and State University, 2008, pp. 1-191.
SpringerLink, [online]; [retrieved on Sep. 26]; retrieved from the Internet http://www.springerlink.com/mcontent/j28t7h7x482tt22n/ SpringerLink-Book Chapter Grant Martin,"A Power and Energy Perspective on MultiProcessors: Designing Embedded Processors," 2007, Chapter 17, pp. 1-5.
Benjamin Wun and Patrick Crowley, "Network I/O Acceleration in Heterogeneous Multicore Processors," Proceedings of the 14th IEEE Symposium on High-Performance Interconnects, IEEE, 2006, pp. 1-6.

\* cited by examiner

*Primary Examiner* — Yong Choe
(74) *Attorney, Agent, or Firm* — Cantor Colburn LLP; Dwayne Nelson

(57) ABSTRACT

An apparatus and method for managing a translation lookaside buffer (TLB). The TLB is shared by a plurality of jobs. The method including the steps of: obtaining at least one attribute of each job of the plurality of jobs; assigning a priority level to each job according to at least one attribute of each job; and managing the related TLB entries of each job according to the priority level of each job. The present invention also provides an apparatus for managing TLB corresponding to the above method. The method and apparatus according to the present invention provide an efficient use of the shared TLB.

16 Claims, 4 Drawing Sheets

| Job ID | Execution status | Execution mode | Related entries | The last execution time |
|---|---|---|---|---|
| Job 1 | Completed | Fixed | 3—6 | Time 1 |
| Job 2 | Suspended | Dynamically changing | 8—10 | Time 2 |
| Job 3 | Executing | Fixed | 12—15 | Time 3 |

| Job ID | Execution status | Execution mode | Priority level |
|---|---|---|---|
| Job 1 | Executing | Fixed | First |
| Job 2 | Executing | Dynamically changing | First |
| Job 3 | Suspended | Fixed | Second |
| Job 4 | Suspended | Dynamically changing | Third |
| Job 5 | Completed | Fixed | Fourth |
| Job 6 | Completed | Dynamically changing | Fifth |

METHOD AND APPARATUS FOR MANAGING TLB

CROSS-REFERENCE TO RELATED APPLICATION

This application claims priority under 35 U.S.C. §119 from Chinese Patent Application No. 200910127588.6 filed Mar. 23, 2009, the entire contents of which are incorporated by reference herein.

BACKGROUND OF THE INVENTION

1. Field of the Invention

The present invention relates to TLB (translation look-aside buffer). More particularly, the present invention relates to a method and apparatus for managing a shared TLB.

2. Description of the Related Art

To meet the needs of processing large volumes of information, the demand for processor speed becomes higher and higher. In order to improve processing speed constantly, processing systems have been upgraded from traditional single core processors to multi-core systems, that is, processing data information using a plurality of CPU cores concurrently. Recently, heterogeneous multi-core processing systems have been proposed. The heterogeneous multi-core approach alters the multi-core architecture from traditional homogeneous design to heterogeneous design of "main core+accelerators," that is, one or more general-purpose cores of the processors implement general computing while other specific computing is done by specialized hardware cores, that is, accelerators or coprocessors, via which the efficiency and performance of the processors can be improved greatly.

FIG. 1 illustrates a block diagram of a heterogeneous multi-core system. As shown in FIG. 1, the processing system includes four CPU cores, also called main cores, and four coprocessors, also called accelerators, which are connected with interfaces and a bus therebetween. The four cores are used to perform all general-purpose tasks and assign specific tasks, while the four coprocessors are used to perform the assigned specific tasks. As specialized hardware, the coprocessors can be exemplarily of any type of DSP (digital signal processors) upon their purpose. For example, these DSP can be a Java interpreter, MPEG video engine, or encrypting/decrypting processor. When performing specific tasks, the coprocessors have much higher efficiency and lower power consumption than general-purpose cores. With this heterogeneous design, the processing system can assign high-load specific tasks to the coprocessors, by which the main cores' operating pressure is reduced greatly and the system efficiency is improved.

Like general processors, when executing all kinds of task processing, coprocessors also use TLB (translation look-aside buffer) to access data. TLB is a part of high-speed cache in the processor used to store some page tables. These page tables are used to perform address mapping and translation in data processing. Specifically, TLB includes a plurality of entries, each of which stores a mapping relation between virtual address and physical address of the memory. Each main core keeps its own TLB because the main cores are used to perform a vast amount of general computing and thus have relatively complex logic. However, for the coprocessors, on the one hand, they need to keep their own TLB to avoid the performance reduction caused by searching TLB entries in the main cores through the bus each time they access data. On the other hand, coprocessors have relatively simple logic for performing relatively simple operations and thus a plurality of coprocessors can share one TLB to save resources. Therefore, one TLB can be embedded in the common interface among a plurality of coprocessors, and be shared by the coprocessors connecting to the interface.

When assigning a job to coprocessors, usually, the main core needs to write address mapping relations of the data related to the job into the TLB used by the coprocessors. This process can be called the initialization of TLB. Then, the main core can start-up the coprocessors to execute data processing after the data is prepared. In this way, the coprocessors access data using the TLB entries written by the main cores and perform specific data processing tasks according to the instructions from the main cores. In many situations, coprocessors need to execute a plurality of jobs or a job queue in time-sharing mode. Besides, as above mentioned, one TLB can be shared by a plurality of coprocessors. That is, a plurality of coprocessors use one TLB to execute a plurality of jobs.

FIG. 2 is a graphic illustration of a plurality of coprocessors sharing one TLB. As shown in the figure, three coprocessors use one TLB to execute data processing together. What is more, each coprocessor exemplarily executes one job queue in time-sharing mode. Therefore, all address mapping relations referenced in all jobs executed by these three coprocessors have to be stored in the one common TLB. However, it's known that the number of entries in TLB is so limited that how to manage and distribute these entries in order to make them shared and used more effectively becomes different.

SUMMARY OF THE INVENTION

This invention provides a method and apparatus for managing shared TLB (translation look-aside buffer) to achieve effective management of shared TLB entries.

According to the first aspect of the invention, a method for managing a TLB is provided, the TLB being used and shared by a plurality of jobs. The method includes the steps of obtaining at least one attribute of each job in the plurality of jobs, assigning a priority level to each job according to at least one attribute of each job, and managing the related TLB entries of each job according to the priority level of each job.

According to the second aspect of the invention, an apparatus for managing a TLB is provided, the TLB being used and shared by a plurality of jobs. The apparatus includes an attribute obtaining unit, configured to obtain at least one attribute of each job in the plurality of jobs, a priority assigning unit, configured to assign priority level to each job according to the at least one attribute of each job, and managing unit, configured to manage the related TLB entries of each job according to the priority level of each job.

With the method and apparatus proposed by this invention, it can be determined which TLB entries should be reserved and which should be cleared based on the attributes of each job so as to effectively manage the TLB shared by a plurality of coprocessors and improve the usability of the shared TLB.

DETAIL DESCRIPTION OF THE PREFERRED EMBODIMENTS

Following is the detailed description of the preferred embodiments of the present invention in connection with the drawings.

Figure 1:
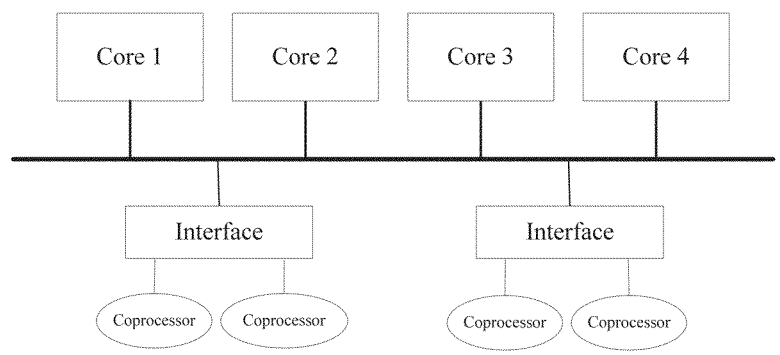
FIG. 1 is a block diagram of a heterogeneous multi-core system.
Figure 2:
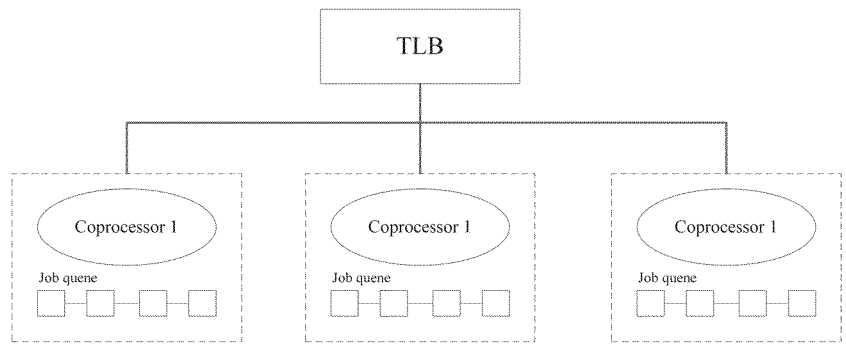
FIG. 2 is a graphic illustration of a plurality of coprocessors sharing one TLB.
Figures 3, 4:
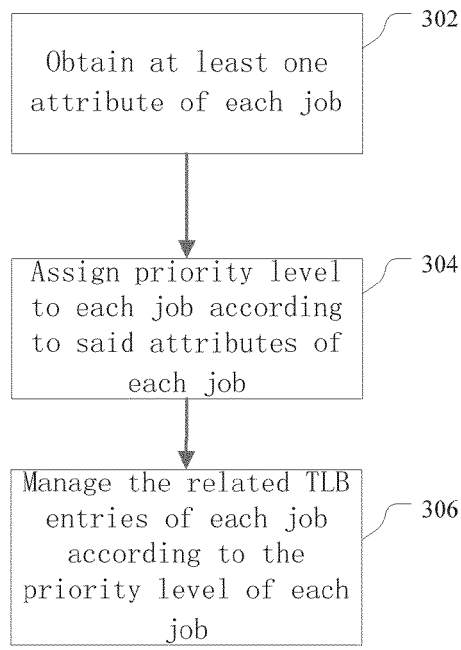
FIG. 3 is a flowchart of a method for managing shared TLB according to one embodiment of the invention.
FIG. 4 illustrates an attribute table according to one embodiment of the invention.

FIG. 3 is a flowchart of a method for managing shared TLB according to one embodiment of the present invention. The method of this embodiment is applicable to the situation illustrated in FIG. 2, that is, a plurality of coprocessors use one shared TLB to execute a plurality of jobs. To manage such TLB, the method includes the following steps as shown in the figure: obtaining at least one attribute of each job at step 302; assigning priority to each job according to the attributes of each job at step 304; and managing the related TLB entries of each job according to the priority of each job at step 306.

Specifically, at step 302, the attributes of each job in the shared TLB are obtained wherein the attributes can relate to the factors such as the mode, the time and the status of each job using TLB entries. For instance, in one embodiment, the attributes include job execution status, that is, completed, executing and suspended. "Suspended" means a job is abnormally interrupted because of TLB miss, or cache overflow, for example. At this time, the job has not been finished but just interrupted temporarily. Once it gets the needed page table back, the job executing will be continued. For such job attributes, one way to obtain the attributes at step 302 is to use the runtime library to dynamically monitor and set the execution status of each job.

In another embodiment, the job attributes also include job execution mode. The execution mode means the manner of occupying and accessing TLB entries during job execution, including fixed mode and dynamically changing mode or variable mode. Specifically, when processing data, some jobs fixedly use the same part of virtual addresses to access the same part of TLB entries invariably and thus can be called in fixed execution mode. For the jobs related in network processing, most jobs use fixed TLB entries to process data, and therefore can be seen as fixed job execution mode. However, other jobs, when processing data, use different virtual addresses dynamically, access different TLB entries variably, and thus can be called in dynamically changing execution mode or variable mode.

To obtain the job execution mode, in one embodiment, an API is provided for users, here mainly referring to job constitutors, for example programmers, to allow the programmers to define the job execution mode in the job description, for example in the program. In this case, the job execution mode can be obtained by reading users' definition. In another embodiment, the job execution times m in a certain period and the TLB initialization times n in these m execution times can be derived. As above mentioned, when assigning a job to coprocessors, the main core needs to write the address mapping relations of related data in the job into the TLB used by coprocessors, that is, to perform a TLB initialization. However, if the address mapping relations or the TLB entries needed each time executing one job is the same, it is not necessary to perform TLB initialization again in the next job execution time. That is, for the jobs inclined to use the same TLB entries in a plurality times of executions, that is, to access TLB with fixed mode, the "frequency" of TLB initialization is relatively lower. Therefore, based on the obtained execution times m and the initialization times n, the TLB initialization "frequency" n/m in these m execution times can be derived easily. By comparing this frequency to a pre-set threshold or reference value, the job execution mode can be analyzed. It is understood that this analyzing method can be combined with the method allowing user definition so as to obtain the job execution mode.

In other embodiments, the job attributes also include the last job execution time, and job execution frequency, for example. Job execution frequency can be derived by monitoring the job execution times in a certain passed period, for example 10 minutes or half an hour.

In one embodiment, various job attributes are recorded in an attribute table. At step 302, the needed attributes are read selectively from this table. FIG. 4 illustrates an attribute table according to one embodiment of the invention. As shown in FIG. 4, the attribute table records the execution status, the execution mode, the related TLB entries and the last execution time of each job correspondingly. With such an attribute table, the attribute information of each job can be captured simply and clearly. For example: job 1 has been completed, the execution mode is fixed, the related TLB entries are entries 3-6, the last execution time is time 1; job 2 is suspended, the execution mode is dynamically changing, and the related entries are entries 8-10.

It is understood that a part or all of the attributes listed above can be obtained selectively at step 302 mentioned above. Moreover, it will be readily apparent to those skilled in the art that other attributes of a job can be captured for further analysis, for example, the average execution time of a job, and the correlation among jobs.

After capturing the above job attributes, the method of this embodiment goes to step 304, in which the priority is assigned to each job according to the attributes of each job.

In one embodiment, a higher priority is assigned to the jobs with fixed mode than that with dynamically changing mode. In another embodiment, the jobs with suspended status are assigned a relatively higher priority. The priority assignment solutions in these two embodiments can also be combined together as needed.

Figures 5, 6:
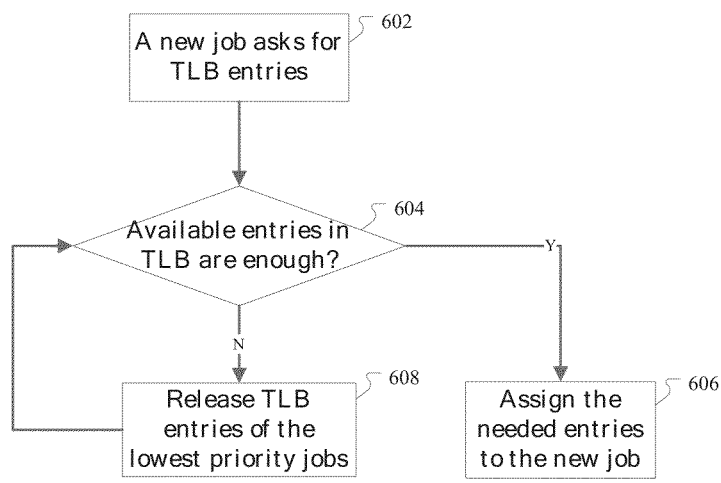
FIG. 5 is a table illustrating a priority assignment solution according to one embodiment of the invention.
FIG. 6 is a flowchart of managing TLB entries according to one embodiment of the invention.

FIG. 5 is a table illustration of a priority assignment solution according to one embodiment of the invention. The first column in this table records the job ID of a plurality of jobs sharing one TLB, the second column records the execution status of each job, the third column records the execution mode of each job and the fourth column records the priority of each job assigned according to the information in the third and the fourth column. In this embodiment, the job execution status is judged and the highest priority level is assigned to the executing jobs regardless their execution mode. Thus, job 1 and job 2 in executing status both have the first priority level. Then a relative higher priority is assigned to the suspended jobs. For job 3 and job 4 both with suspended status, to distinguish their priority level, their execution mode is further judged and a higher priority level is assigned to the job with fixed mode than that with dynamically changing mode. Thus, job 3 with fixed mode has higher priority level than job 4 with variable mode. Therefore, job 3 has the second priority level and job 4 has the third priority level. The lowest priority levels are assigned to the completed jobs. Similarly, to further distinguish the priority level of a plurality of completed jobs, more detailed priority level can be assigned to these jobs according to their execution mode. Therefore, job 5 with fixed mode has the fourth priority level and job 6 with dynamically changing mode has the last priority level.

In the priority assignment shown in FIG. 5, various priority levels are assigned to each job according to the execution status and the execution mode. However, it is possible that a plurality of jobs have the same priority level. For example, there are multiple completed jobs sharing one TLB with fixed mode. On the other hand, for subsequent management of the TLB entries, it may need to further distinguish these jobs to make each job have a different priority level, especially for the jobs with relatively lower priority level. Therefore, based on the priority assignment in FIG. 5, other job attributes can be taken into account to distinguish the jobs with the same priority level.

In one embodiment, for the jobs with the same execution status and the same execution mode, their last execution time is further considered. Specifically, in one example, a higher priority level is assigned to the jobs whose last execution time is later. Because the last execution time must be different for different jobs, various jobs can be distinguished in terms of priority levels.

In another embodiment, for the jobs with the above attributes the same, their execution frequency is further considered. For example, in one example, job A and job B have the same execution mode, but in the last 30 minutes, job A has been executed 10,000 times and job B has been executed 10 times. Then, it can be determined that the potential execution possibility of job A is higher than that of job B, and therefore a higher priority is assigned to job A. That is, a higher priority is assigned to the jobs with a higher execution frequency.

As described above, besides users' definition, the execution mode can also be determined by analyzing the TLB initialization frequency during job execution. Thus, even two jobs are both set as fixed mode, or confirmed to be fixed mode through the above analysis, their TLB initialization frequencies are still possibly different, that is, the tendency degree to the fixed mode is possibly different. The frequency or the degree can also be considered as an attribute used to distinguish the job priority. Specifically, higher priority level can be assigned to the jobs with lower TLB initialization frequency.

It is understood that those skilled in the art can select, combine and extend the above mentioned priority assignment solutions as desired, and adopt proper solution to perform priority assignment based on the above described embodiments. Typically, the assigned priority of a job reflects, in some aspects, the potential possibility of executing the job again.

After assigning a priority level to each job, the method of this embodiment advances to step 306, in which the related TLB entries of each job are managed according to its priority level. Specifically, the related TLB entries of the jobs with higher priority level are reserved and the related TLB entries of the jobs with lower priority level are released.

FIG. 6 is a flowchart of managing TLB entries according to one embodiment of the invention. As shown in the figure, a new job asks for TLB entries at step 602. Then, it is judged whether the current available TLB entries are enough for the new job at step 604. If the available entries are enough, it goes to step 606, in which the requested entries are assigned to the new job. If the current available entries cannot meet the needs of the new job, it goes to step 608 in which the TLB entries used by the jobs with the lowest priority level are released. Then the entries occupied by these jobs with the lowest priority become available. Therefore, the method turns back to step 604 to make judgement again, and continuously releases the entries occupied by the jobs with the lowest priority level until the available entries are enough for the new job.

Figure 7:
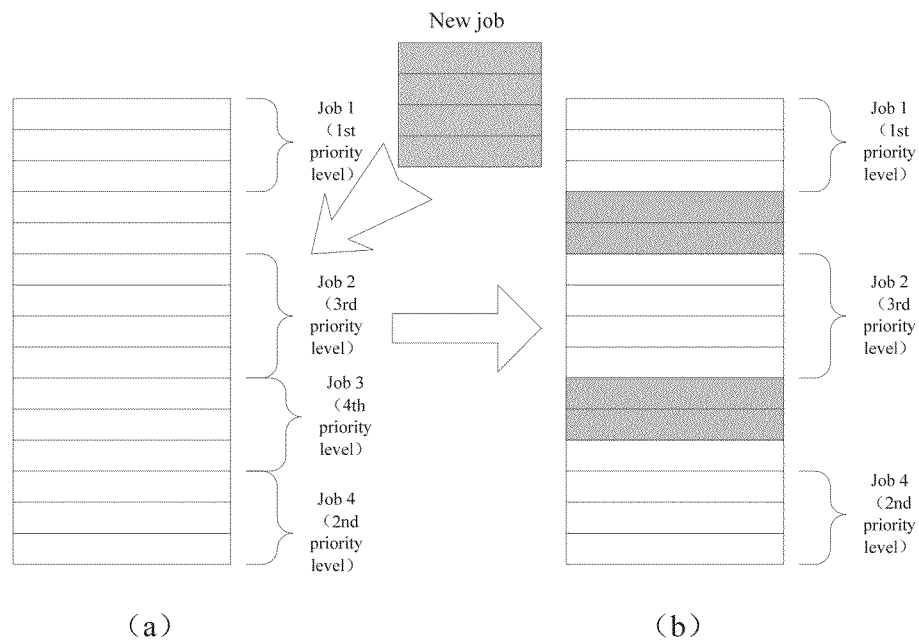
FIG. 7 illustrates the assignment and management of TLB entries according to one embodiment of the invention.

Following is the detailed description of the above managing flow in connection with the embodiment in FIG. 7. FIG. 7 illustrates the assignment and management of TLB entries according to one embodiment of the invention. As shown in FIG. 7(*a*), the TLB in this embodiment includes 15 entries, wherein entries 1-3 are assigned to job 1, which has the first priority level; entries 6-9 are assigned to job 2, which has the third priority level; entries 10-12 are assigned to job 3, which has the fourth priority level; and entries 13-15 are assigned to job 4, which has the second priority level. Jobs 1-4 can be from different coprocessors. Supposed the main core currently instructs certain coprocessor to execute a new job, job n, which needs 4 TLB entries. It can be seen that because of the sharing of the TLB by a plurality of jobs from multiple coprocessors, only entries 4-5 are currently available in the TLB, and the others have been assigned to different jobs. However, these two entries cannot fully meet the needs of the new job n. According to the above-described priority assignment solution, lower priority levels are assigned to the jobs with lower possibility of execution again. Therefore, when new jobs ask for TLB entries, the TLB entries occupied by lower priority jobs can be released first to be assigned to the new jobs. For the occupied TLB entries shown in FIG. 7(*a*), job 3, which occupies entries 10-12, has relatively the lowest priority, that is, the fourth priority level. Thus, the related entries of job 3 can be released for the new job n. Then, job n can use the existing available entries 4-5 and the newly released entries 10-12 to store the address mapping relations of the needed data as shown in FIG. 7(*b*). At the same time, the attributes of job n are also analyzed and recorded, based on which the priority level of job n is assigned to be subsequently used as reference for the order of releasing TLB entries.

In another embodiment, releasing the entries occupied by the lowest priority job may still fail to meet the needs of new jobs. Then a plurality of lower priority jobs are released according to the priority order from low to high, until the released entries are enough for the new jobs.

In one embodiment, under the request of the new job, only the entries used by the jobs in the first priority level, that is, by the executing jobs, keep reserved in the TLB. Then, to avoid runtime error of the executing jobs, the new job is asked to wait until the priority of some jobs becomes lower because of being completed or suspended, for example. That is, the entries used by the jobs in the first priority level are always kept reserved in this embodiment when releasing TLB entries based on the priority order.

As described above, the priority level assigned according to job attributes can reflect in some aspects the potential possibility that a job may be executed again. The higher the priority level is the greater the possibility that a job may be executed again in the near future would be. Therefore, releasing TLB entries according to the priority order from low to high can make effective use of the shared TLB. Based on the above description of the embodiments, those skilled in the art are capable of assigning the priority level according to specific job and TLB entry status, and managing TLB entries according to the priority level.

Figure 8:
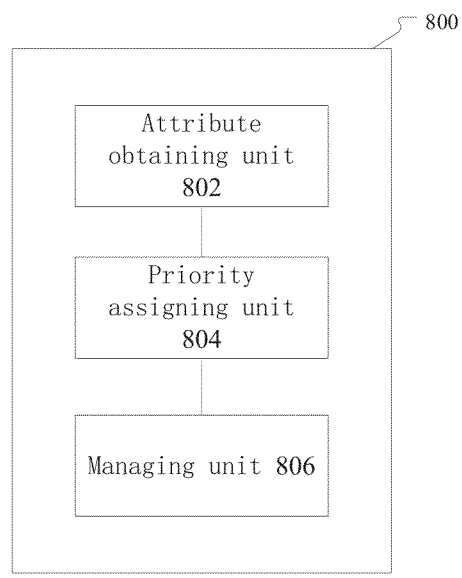
FIG. 8 is a block diagram of an apparatus for managing TLB according to one embodiment of the invention.

Based on the same inventive conception, this invention also provides an apparatus for managing shared TLB. FIG. 8 is a block diagram of an apparatus for managing TLB according to one embodiment of the invention. The apparatus is indicated using number 800 generally, and used to manage a TLB shared by a plurality of coprocessors to execute a plurality of jobs in a sharing manner. As shown in FIG. 8, the apparatus 800 includes: an attribute obtaining unit 802, configured to obtain at least one attribute of each job; a priority assigning unit 804, configured to assign priority level to each job according to the attributes of each job; and a managing unit 806, configured to manage the related TLB entries of each job according to the assigned priority level of each job.

Specifically, the attribute obtaining unit 802 is configured to obtain the attributes of each job sharing the TLB, wherein said attributes can relate to the factors such as the mode, the time, and the status of each job occupying the TLB entries. For example, in one embodiment, the job attributes include the execution status, that is, completed, executing, or suspended. For such job attributes, the attribute obtaining unit 802 can monitor the runtime library to get the execution status of each job.

In another embodiment, the job attributes include the execution mode, which means the manner of occupying and accessing TLB entries during job execution, including fixed mode and dynamically changing mode. To get the job execution mode, in one embodiment, the attribute obtaining unit 802 includes an API, via which users, such as programmers, can define the execution mode in the job description, for example in the program. In this case, the attribute obtaining unit 802 gets the execution mode of each job by reading users' definition. In another embodiment, the attribute obtaining unit 802 can get the execution times m of a job in a certain period and the TLB initialization times n during these m execution times. Then, it can easily get the TLB initialization "frequency" n/m in these m execution times. By comparing this frequency to a pre-set threshold or reference value, the attribute obtaining unit 802 can analyze the job execution mode. It is understood that the attribute obtaining unit 802 can combine this analyzing method with the method allowing user definition through a interface, so as to get the execution mode of the jobs.

In other embodiments, the job attributes also include the last execution time and the execution frequency, for example.

In one embodiment, the attribute obtaining unit 802 records the attributes of each job in an attribute table, which is exemplary shown in FIG. 4. It is understood that the attribute obtaining unit 802 can selectively get a part of or all of the above-listed attributes.

After the job attributes are obtained, the priority assigning unit 804 assigns priority level to each job according to the attributes of each job.

In one embodiment, the priority assigning unit 804 assigns higher priority level to the jobs with fixed execution mode than that with dynamically changing mode. In another embodiment, the unit 804 assigns higher priority level to the jobs in suspended execution status. The assignment solutions in these two embodiments can also be combined.

For a plurality of jobs with the same execution status and the same execution mode, the priority assigning unit 804 can further distinguish them according to other attributes. In one embodiment, the priority assigning unit 804 further refers to the last execution time. Specifically, for example, the job whose last execution time is later is given a higher priority level. Since the last execution time is different for different jobs, the priority levels of these jobs are further distinguished in this way. In another embodiment, the priority assigning unit 804 further refers to the execution frequency when other job attributes are the same, and specifically, assigns higher priority to the jobs with higher execution frequency in view of the assumption that the jobs with higher execution frequency potentially have higher possibility of execution again. The priority assigning unit 804 can further use other attributes, like the above-mentioned TLB initialization frequency, to distinguish and assign priority levels.

The priority assigning unit 804 transfers the priority information of each job to the managing unit 806, so that the latter can manage the related TLB entries of each job according to this priority information. Specifically, the managing unit 806 reserves the TLB entries related to the jobs with higher priority level and releases the TLB entries related to the jobs with lower priority level.

In one embodiment, when a new job asks for TLB entries, the managing unit 806 checks the shared TLB to determine whether there are enough available TLB entries for the new job. If there are enough available TLB entries, it assigns the corresponding amount of available entries to the new job. If the available TLB entries are not enough for the new job, then the managing unit 806 releases the entries occupied by the jobs with the lowest priority level to make them available and judges again whether the currently available entries are enough or not. If they still fail to meet the needs of the new job, the managing unit 806 sequentially releases the related entries of lower priority jobs according to the priority order from low to high until the entries are enough. In one embodiment, under the request of the new job, only the entries used by the first priority level jobs, that is, the entries used by the executing jobs are not released in the TLB. Then, to avoid runtime error of these executing jobs, the managing unit 806 can ask the new job to wait until the priority levels of some jobs becomes lower. That is, in this embodiment, the managing unit 806 always reserves the entries of the first priority level jobs, while releasing TLB entries based on the priority order.

It is understood that the managing apparatus shown in FIG. 8 can be used to execute the method for managing shared TLB shown in FIG. 3. With the above-described method and apparatus, the shared TLB entries can be effectively managed and efficiently used.

Through the above description of the embodiments, those skilled in the art will recognize that the above-mentioned managing method and apparatus can be practiced by executable instructions and/or controlling codes in the processors, for example codes in mediums like disc, CD or DVD-ROM; memories like ROM or EPROM; and carriers like optical or electronic signal carrier. The managing apparatus and its units can be realized using hardware like VLSI or Gates and Arrays, such as semiconductors, for example Logic Chip and transistors or like programmable hardware equipments, for example FPGA and programmable logic equipments; or using software executed by different kinds of processors; or using the combination of the hardware and software.

The above-described exemplary embodiments are intended to be illustrative in all respects of the method and apparatus for managing shared TLB, rather than restrictive of the present invention. Those skilled in the art should recognize that the present invention is capable of many variations and modifications, for example changing and extending the manner of obtaining the attributes and assigning the priority levels to make them applicable to different applications. It is understood that all such variations and modifications are contained within the scope and spirit of the present invention. The scope of the present invention is defined only by the appended claims.

What is claimed is:

1. A method for managing a translation look-aside buffer (TLB) which is shared by a plurality of jobs, said method comprising the steps of:

obtaining at least one attribute of each job of said plurality of jobs;

assigning a priority level to each job according to at least one attribute of each job; and managing the related TLB entries of each job according to the priority level of each job;

wherein said at least one attribute includes at least one of the following attributes: job execution status, comprising executing, completed and suspended; job execution mode, comprising fixed mode and dynamically changing mode; job execution frequency; and last execution time of the job.

2. The method of claim 1, wherein said step of obtaining at least one attribute comprises: reading the user-defined job execution mode.

3. The method of claim 1, wherein said step of obtaining at least one attribute comprises: monitoring the initialization frequency of said TLB during job execution and obtaining the job execution mode by analysis.

4. The method of claim 1, wherein said step of assigning priority level to each job comprises: assigning higher priority level to the jobs with fixed mode than that with dynamically changing mode.

5. The method of claim 1, wherein said step of assigning priority level to each job comprises: assigning higher priority level to the jobs with suspended status than that with completed status.

6. The method of claim 1, wherein said step of assigning priority level to each job comprises: assigning higher priority level to the jobs with higher execution frequency.

7. The method of claim 1, wherein said step of assigning priority level to each job comprises: assigning higher priority level to the jobs whose last execution time is later.

8. The method of claim 1, wherein said step of managing the related TLB entries of each job according to the priority level of each job comprises: releasing the TLB entries related to the jobs with lower priority level.

9. An apparatus for managing a translation look-aside buffer (TLB) which is shared by a plurality of jobs, said apparatus comprising:

an attribute obtaining unit, configured to obtain at least one attribute of each job of said plurality of jobs;

a priority assigning unit, configured to assign priority level to each job according to at least one attribute of each job; and a managing unit, configured to manage the related TLB entries of each job according to the priority level of each job; wherein said at least one attribute includes at least one of the following attributes: job execution status, comprising executing, completed and suspended; job execution mode comprising fixed mode and dynamically changing mode; job execution frequency; and last execution time of the job.

10. The apparatus of claim 9, wherein said attribute obtaining unit is further configured to read the user-defined job execution mode.

11. The apparatus of claim 9, wherein said attribute obtaining unit is further configured to monitor the initialization frequency of said TLB during job execution and obtain the job execution mode by analysis.

12. The apparatus of claim 9, wherein said priority assigning unit is further configured to assign higher priority level to the jobs with fixed mode than that with dynamically changing mode.

13. The apparatus of claim 9, wherein said priority assigning unit is further configured to assign higher priority level to the jobs with suspended status than that with completed status.

14. The apparatus of claim 9, wherein said priority assigning unit is further configured to assign higher priority level to the jobs with higher execution frequency.

15. The apparatus of claim 9, wherein said priority assigning unit is further configured to assign higher priority level to the jobs whose last execution time is later.

16. The apparatus of claim 9, wherein said managing unit is further configured to release the TLB entries related to the jobs with lower priority level.

* * * * *